United States Patent
Moy et al.

(10) Patent No.: US 8,510,116 B1
(45) Date of Patent: Aug. 13, 2013

(54) SYNCHRONIZED VOICE SIGNATURE

(75) Inventors: Curt Wayne Moy, San Antonio, TX (US); Sakina Hassonjee, Alamo Heights, TX (US); Amy Irene Forsythe, San Antonio, TX (US); Linda Giessel King, San Antonio, TX (US); Sarah Brooke Severson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1444 days.

(21) Appl. No.: 11/925,535

(22) Filed: Oct. 26, 2007

(51) Int. Cl.
*G10L 15/00* (2006.01)

(52) U.S. Cl.
USPC ........... 704/275; 704/246; 705/75; 705/14.64

(58) Field of Classification Search
USPC ........................ 704/246, 275; 705/75, 14.64
See application file for complete search history.

(56) References Cited

U.S. PATENT DOCUMENTS

| | | | |
|---|---|---|---|
| 5,659,547 A | 8/1997 | Scarr et al. | |
| 5,659,793 A | 8/1997 | Escobar et al. | |
| 6,012,144 A * | 1/2000 | Pickett | 726/26 |
| 6,169,787 B1 | 1/2001 | Shimada et al. | |
| 6,487,401 B2 | 11/2002 | Suryanarayana et al. | |
| 7,127,417 B2 | 10/2006 | Azuma | |
| 7,379,920 B2 | 5/2008 | Leung et al. | |
| 7,463,730 B2 | 12/2008 | Katkam et al. | |
| 7,469,210 B1 * | 12/2008 | Kittrell et al. | 704/270 |
| 7,475,017 B2 | 1/2009 | Ju et al. | |
| 7,502,611 B2 | 3/2009 | McCann et al. | |
| 2003/0032409 A1 | 2/2003 | Hutcheson et al. | |
| 2004/0157592 A1 * | 8/2004 | Lipton et al. | 455/415 |
| 2004/0267527 A1 | 12/2004 | Creamer et al. | |
| 2005/0060182 A1 | 3/2005 | Nagelvoort | |
| 2005/0071226 A1 * | 3/2005 | Nguyen et al. | 705/14 |
| 2005/0075985 A1 * | 4/2005 | Cartmell | 705/67 |
| 2005/0222913 A1 | 10/2005 | Eisenberg | |
| 2005/0249216 A1 | 11/2005 | Jones | |
| 2005/0261031 A1 | 11/2005 | Seo et al. | |
| 2006/0025996 A1 | 2/2006 | Ju et al. | |

(Continued)

OTHER PUBLICATIONS

Anton, J. and Chatterley, J. "Voice Signatures—Using a Call Center to Collect Legally Binding Signatures on Forms and Contracts." Benchmark Portal, Inc., Sponsored by Voice Signatures, Feb. 14, 2007.

(Continued)

*Primary Examiner* — Daniel D Abebe
(74) *Attorney, Agent, or Firm* — Brooks, Cameron & Huebsch, PLLC

(57) ABSTRACT

Methods and systems are disclosed for capturing consumer voice signatures. The methods and systems synchronize voice signatures with display of the terms and conditions of a transaction to the consumer in real time during a phone conversation. In one implementation, mobile devices with text display capability may be used to display the terms/conditions of the transaction while the consumer is talking to a customer service representative or an interactive voice response system. The terms/conditions may be displayed as a scrollable document on the mobile device to which the consumer may then agree during the phone conversation. The consumer may then "voice sign" by reading the displayed terms/conditions, or some portion thereof, during the phone conversation to manifest his/her knowing consent. Such an arrangement helps promotes the use of voice signatures by consumers in a manner that complies with the requirements of the federal E-Sign Act.

21 Claims, 8 Drawing Sheets

(56) References Cited

U.S. PATENT DOCUMENTS

| | | | |
|---|---|---|---|
| 2006/0047568 | A1 | 3/2006 | Eisenberg et al. |
| 2007/0053518 | A1 | 3/2007 | Tompkins et al. |
| 2007/0201443 | A1 | 8/2007 | Saha et al. |
| 2007/0226097 | A1 | 9/2007 | Keechle |
| 2007/0265031 | A1 | 11/2007 | Koizumi et al. |
| 2007/0281759 | A1 | 12/2007 | Choi |
| 2008/0064371 | A1 | 3/2008 | Madhavapeddi et al. |
| 2008/0096587 | A1 | 4/2008 | Rubinstein |
| 2008/0132255 | A1 | 6/2008 | Benco et al. |
| 2008/0181140 | A1 | 7/2008 | Bangor et al. |
| 2008/0183633 | A1 | 7/2008 | Nagelvoort |
| 2008/0270251 | A1 | 10/2008 | Coelho et al. |
| 2008/0288351 | A1 | 11/2008 | Leung et al. |
| 2009/0006418 | A1 | 1/2009 | O'Malley |
| 2009/0054091 | A1 | 2/2009 | van Wijk et al. |

OTHER PUBLICATIONS

Wright, B. "The Legality of Voice Signatures." White Paper reprinted by Voice Signature LLC, [retrieved on the Internet on Feb. 4, 2008 using <URL: http://www.voicesignature.com/misc/Legality%20of%20Voice%20Signatures.pdf>].

Wright, B. "Voice Signatures" and "Behavioral Signatures vs Transferable Signatures." Law of Electronic Commerce, Jul. 2005 and Aug. 2005 Web Updates, Aspen Law and Business, [retrieved on the Internet on Feb. 4, 2008 using <URL: http://www.voicesignature.com/misc/Voicesignatures.pdf>].

Federal Trade Commission and Department of Commerce. "Electronic Signatures in Global and National Commerce Act: The Consumer Consent Provision in Section 101(c)(1)(C)(ii)." Jun. 2001, [retrieved on the Internet on Feb. 4, 2008 using <URL: http://www.ftc.gov/os/2001/06/esign7.htm>].

106th Congress. "Electronic Signatures in Global and National Commerce Act." Public Law 106-229, Jun. 30, 2000, p. 464-476, [retrieved on the Internet on Feb. 4, 2008 using <URL: http://www.fca.gov/Download/Public%20Law%20106-229%20E-Sign.pdf>].

IBM TDB "Short Message Assisted Multimodal Voice/Telephony Server", Nov. 12, 2001 Retrieved from IP.com (IP.com No. IPCOM000015310D).

* cited by examiner

SYNCHRONIZED VOICE SIGNATURE

CROSS-REFERENCE TO RELATED APPLICATIONS

This application is related in subject matter to, and incorporates herein by reference in its entirety, each of the following: U.S. patent application Ser. No. 11/925,543 entitled "Synchronized Voice Signature," filed on the same date as this application; and U.S. patent application Ser. No. 11/925,549 entitled "Synchronized Voice Signature," also filed on the same date as this application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to various types of business transactions and, more specifically, to systems and methods for analyzing risks associated with the transactions.

BACKGROUND

Businesses, such as banks, automobile dealerships, credit card companies, mortgage companies, insurance companies, investment companies, and the like, handle numerous types of business transactions. Examples of business transactions may include purchasing a vehicle, obtaining a mortgage, opening a checking account, buying an insurance policy, applying for a credit card, and the like. These transactions often involve legal documents (e.g., contracts, agreements, etc.) that require some type of signature by the consumer as evidence of his/her knowing consent to the terms and conditions of the transactions.

The legal documents have traditionally been paper documents and the signatures have historically been handwritten. However, with the passage of the federal Electronic Signatures in Global and National Commerce Act (E-Sign) on Jun. 30, 2000, businesses may now obtain consent from consumers electronically. In brief, E-Sign grants electronic signatures and documents equivalent legal status with traditional handwritten signatures. The Act defines an electronic signature as an "electronic sound, symbol, or process, attached to or logically associated with a contract or other record and executed or adopted by a person with the intent to sign the record."

One result arising out of E-Sign is the acceptance of voice signatures as a permissible form of electronic signature. A voice signature, in general, is an audio recording created by an individual who intends to sign a particular document or transaction. The voice signature may be provided to a live customer service representative who records the voice signature, or it may be provided to an interactive voice response system that captures the voice signature.

Because of the above, many businesses have begun incorporating the use of voice signatures into their business processes. Thus, a consumer calling a company's customer service representative regarding a transaction may now be given the opportunity to enter into and complete that transaction, or even another transaction, during the same call. In a typical scenario, the consumer is provided with the terms and conditions of the transaction during the call (including any notices and disclosures) and may then accept or consent to that transaction verbally.

In order for the voice signature to be effective under E-Sign, however, the consumer must demonstrate that he/she can access the terms and conditions (and any notices or disclosures therefor) in electronic form. There are currently two accepted methods for presenting such information to the consumer: (1) the consumer is read the terms and conditions (and any notices or disclosures therefor) over the phone; or (2) during the call, the consumer is directed to a Web site where the information may be viewed. After hearing or reading the terms, the consumer may signify his/her consent by speaking or otherwise activating a voice signature (e.g., "If you agree to the terms that were read to you, then sign the agreement by pressing #1 or stating 'Yes'").

The above arrangement is ineffective, however, when a lengthy legal document must be read to the consumer over the phone. Oftentimes, the consumer simply opts out of the transaction rather than listen to a long legal message or getting on a computer and logging on to some Web site. In addition, some businesses impose a per minute charge on the consumer for the time he/she spends with the company's customer service personnel on the phone.

Accordingly, what is needed is a more effective way to capture consumer voice signatures in connection with business transactions. More specifically, what is needed is a way for businesses to present the terms and conditions of the transaction (and any notices or disclosures therefor) to the consumer over the phone without requiring him/her to listen to a long legal message or getting on a computer and going to a Web site.

SUMMARY

The disclosed embodiments are directed to methods and systems for presenting the terms and conditions of a business transaction, and any notices or disclosures therefor, to the consumer over the phone. The methods and systems synchronize voice signatures with display of the terms and conditions of the transaction to the consumer in real time during a phone conversation. In one implementation, mobile devices that display text messages (e.g., using Short Messaging Service (SMS)) may be used to display the terms and conditions of the transaction at the same time the consumer is talking to a customer service representative or a voice response system. The terms and conditions may be displayed as a scrollable document on the mobile device to which the consumer may then agree during the phone conversation. The consumer may then "voice sign" by reading the displayed terms and conditions, or some portion thereof, during the phone conversation to manifest his/her knowing consent. Such an arrangement helps promotes the use of voice signatures by consumers in a manner that complies with the requirements of the federal E-Sign Act.

BRIEF DESCRIPTION OF THE DRAWINGS

The foregoing and other advantages of the invention will become apparent from the following detailed description and upon reference to the drawings, wherein.

DETAILED DESCRIPTION

Figure 1:
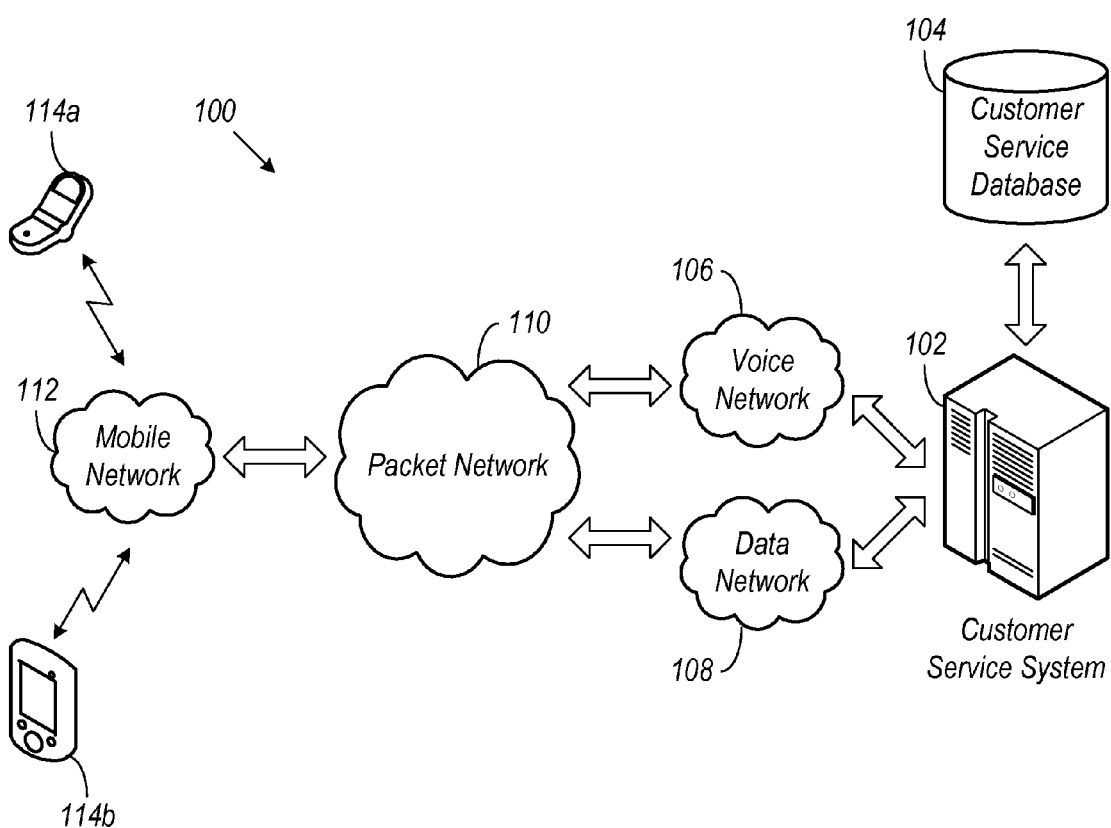
FIG. 1 illustrates an exemplary infrastructure for obtaining voice signatures according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Referring now to FIG. 1, an exemplary infrastructure 100 is shown for conducting business transactions over the phone according to the disclosed embodiments. The exemplary infrastructure 100 is typical of such infrastructures insofar as it allows voice and data communication between a business and consumers to occur in real time. As can be seen, on the business side, the infrastructure 100 typically comprises a call center having a customer service system 102 and a customer service database 104 to which customers may call in for assistance with a transaction. The customer service system 102 and the customer service database 104 allow a company's customer service representatives to access applications pertaining to various products and/or services as well as customer information in order to assist the customers.

Phone calls may be placed to and from the customer service system 102 over a voice network 106, which typically includes voice lines connected to a Public Switched Telephone Network (PSTN) and a PSTN gateway. In a similar manner, access to the Internet, including the World Wide Web, as well as sending and receiving of e-mail messages, may be accomplished over a data mobile network 112, which typically includes data lines connected to a local area network (LAN) and an Internet service provider (ISP). The voice network 106 and data mobile network 112 are in turn connected to a packet network 110, which includes numerous Points of Presence (POP) connected to Network Access Points (NAP) that are in turn connected to numerous switches and routers. These components that are fairly well known to those having ordinary skill in the art and are therefore not expressly shown here.

In operation, a voice call from the customer service system 102 is sent through the voice network 106 where it is digitized and divided into packets that are routed through the packet network 110 using a circuit-switched protocol, such as Plain Old Telephone Service (POTS). This means the voice packets travel through the packet network 110 along a path that, once selected, remains dedicated for the duration of the call. In contrast, data packets from the customer service system 102 may be routed through the packet network 110 along numerous paths using a packet-switched protocol (e.g., TCP, Multi-protocol Label Switching (MPLS), Asynchronous Transfer Mode (ATM), X.25, Frame relay, etc.). Once the data packets reach their destination node in the packet network 110, an assembler assembles the data packets according to their original sequence.

From the destination node, the voice packets and data packets are sent through a mobile network 112 and subsequently to the customers via mobile devices 114a and 114b where they are decoded into voice and data, respectively. Examples of the mobile network 112 may include Global System for Mobile Communications (GSM), General Packet Radio Service (GPRS), Enhanced Data rates for GSM Evolution (EDGE), Universal Mobile Telecommunications System (UMTS), and numerous other digital mobile communication networks. Examples of the mobile devices 114a-b may include cell phones, personal digital assistants (PDA), Blackberry, smart phones, and numerous other handheld communication devices that are capable of handling both voice calls as well as data in the form of a text display.

In accordance with the disclosed embodiments, the customer service system 102 is capable of synchronizing speech with data, such as a text message or an e-mail message, to display the terms and conditions of the transaction to the consumer in real time during a phone conversation. The customer may then "voice sign" by reading the displayed terms and conditions, or some portion thereof, during the phone conversation to manifest his/her knowing consent. Where the functionality is available, it is also possible for the customer to manifest consent by clicking on a "Submit" button or the like on the display of the telephone, or to respond to the text message or e-mail message. Alternatively (or in addition), the customer may be asked to read back the terms and conditions to the customer service representative. In some implementations, the customer may be advised that there may be certain restrictions on the customer's ability to "voice sign," such as while he/she is driving or other activities that require the use of the customer's hands, in order to minimize potential hazards or safety risks to the customer and others. In any event, such an arrangement helps facilitate faster purchase of products and services, thereby providing a convenient "one-and-done" solution for businesses and consumers alike.

Figure 2:
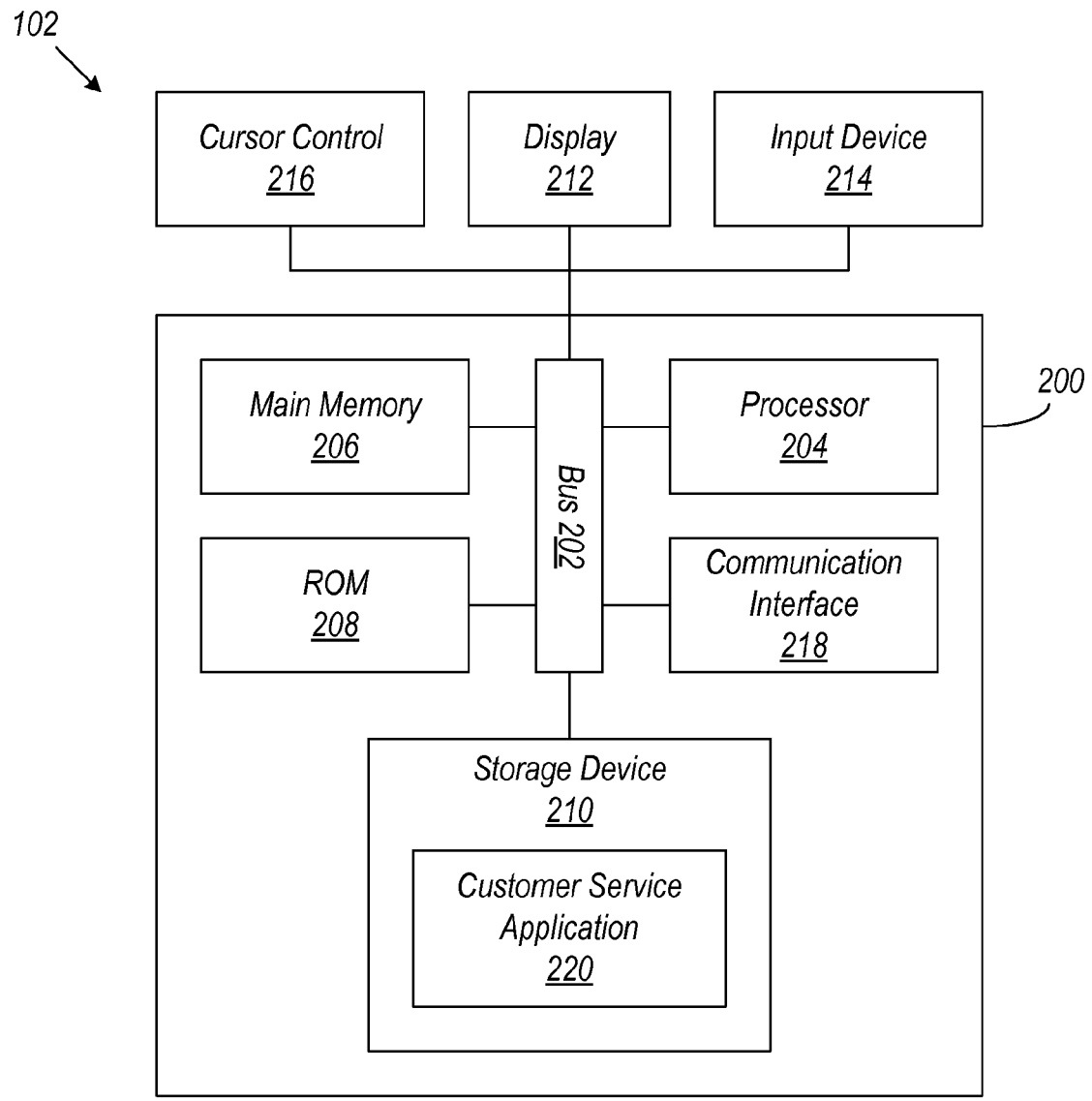
FIG. 2 illustrates an exemplary system for obtaining voice signatures according to the disclosed embodiments.

FIG. 2 illustrates an example of the customer service system 102 according to the disclosed embodiments. As can be seen, in some embodiments, the customer service system 102 may be composed of a typical computer system 200. Any suitable computer system 200 known to those having ordinary skill in the art may be used as the customer service system 102, including a personal computer, server, workstation, mainframe, and the like. Furthermore, although a single computer system is shown in FIG. 2, those having ordinary skill in the art will understand that the customer service system 102 may include multiple computer systems working in conjunction with one another.

The computer system 200 typically includes a bus 202 or other communication mechanism for communicating information and a processor 204 coupled with the bus 202 for processing information. The computer system 200 may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The computer system 200 may further include a read-only memory (ROM) 208 or other static storage device coupled to the bus 202 for storing static information and instructions for the processor 204. A computer-readable storage device 210, such as a magnetic, optical, or solid state device, may be coupled to the bus 202 for storing information and instructions for the processor 204.

The computer system 200 may be coupled via the bus 202 to a display 212, such as a cathode ray tube (CRT) or liquid crystal display (LCD), for displaying information to a customer. An input device 214, including, for example, alphanumeric and other keys, may be coupled to the bus 202 for communicating information and command selections to the processor 204. Another type of customer input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the computer system 200 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The computer system 200 may also include a communication interface 218 coupled to the bus 202. The communication interface 218 typically provides a two way data communication coupling between the computer system 200 and the network 110. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, a customer service application 220, or more precisely, the computer-readable instructions therefor, may reside on the storage device 210. The customer service application 220 may then be executed to assist customers with various business transactions as needed. In particular, the customer service application 220 allows a company's customer service representatives to access information pertaining to various products and/or services offered by the company as well as customer information in order to assist the customers. In addition, the customer service application 220 allows the customer service representative to capture a voice signature in a manner that complies with the requirements of the federal E-Sign Act.

Figure 3:
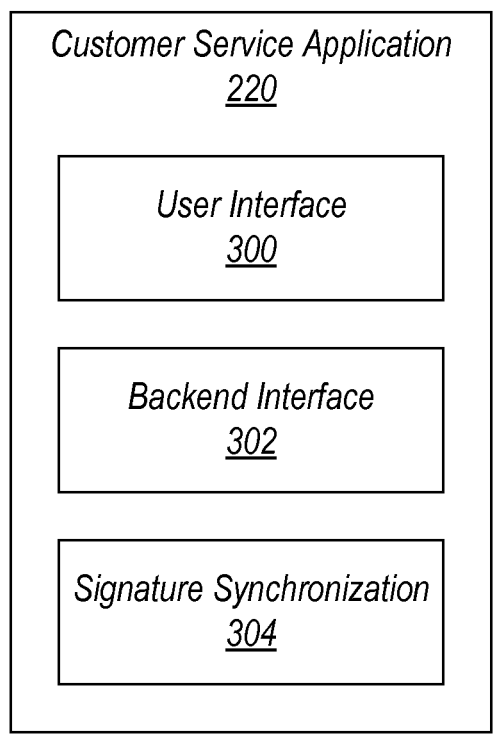
FIG. 3 illustrates an exemplary application for obtaining voice signatures according to the disclosed embodiments.

Referring now to FIG. 3, in one embodiment, the customer service application 220 may comprise a number of functional components, including a user interface module 300, a backend interface 302, and a signature synchronization 306. Other functional components may also be added to or removed from the customer service application 220 without departing from the scope of the disclosed embodiments. Note that although the various functional components 300-304 of the customer service application 220 have been shown as discrete units in FIG. 3, those having ordinary skill in the art will understand that two or more of these components may be combined into a single component, and that any individual component may be divided into several constituent components, without departing from the scope of the disclosed embodiments.

In general, the user interface module 300 is responsible for allowing a user to interact with the various functional components of the customer service application 220 as needed. To this end, the user interface module 300 may provide a graphical user interface for displaying information to the user and for receiving input from the user. Such input may include, for example, selection of a particular product and/or service in which the customer may be interested, retrieving customer information, modifications and adjustments to the customer information, and the like. Any graphical user interface known to those having ordinary skill in the art may be used, as the particular design and layout of the graphical user interface is not overly important to the practice of the disclosed embodiments.

The backend interface module 302 may function to provide an interface between the customer service application 220 and the various backend systems (not expressly shown) of the business. For example, in an insurance company, the backend interface module 302 may allow the customer service application 220 to communicate with processes running on the backend systems that are responsible for generating quotations of premium, and the like. In a bank, the backend interface module 302 may allow the customer service application 220 to communicate with processes running on the backend systems that are responsible for opening a new account, and the like. To this end, the backend interface module 302 may implement any communication protocols necessary to allow the customer service application 220 to communicate with the backend systems. Such protocols may include, for example, Hypertext Transfer Protocol (HTTP), File Transfer Protocol (FTP), Telnet, and any other suitable communication protocol known to those having ordinary skill in the art. In addition, the backend interface module 302 may function to implement any data format required for data to be exchanged between the customer service application 220 and the backend systems.

Finally, the signature synchronization module 304 may function to synchronize the customer's voice signature with display of the terms and conditions of the transaction (and any notices or disclosures therefor). In particular, the signature synchronization module 304 allows a customer service representative to push the terms and conditions of the transaction (and any notices or disclosures therefor) to the customer in real time while the customer service representative is conversing with the customer. In one implementation, the terms and conditions may be sent to the customer out-of-band with respect to the voice call; that is, it may be sent during the voice call, but as a separate text or e-mail message independently of the voice call. With this implementation, there may be a slight delay in the arrival of the message containing the terms and conditions due to potential latency in the packet network 110.

In another implementation, the terms and conditions may be sent in-band relative to the voice call so that the terms and conditions arrive together with the speech (explained further below).

Figure 4:
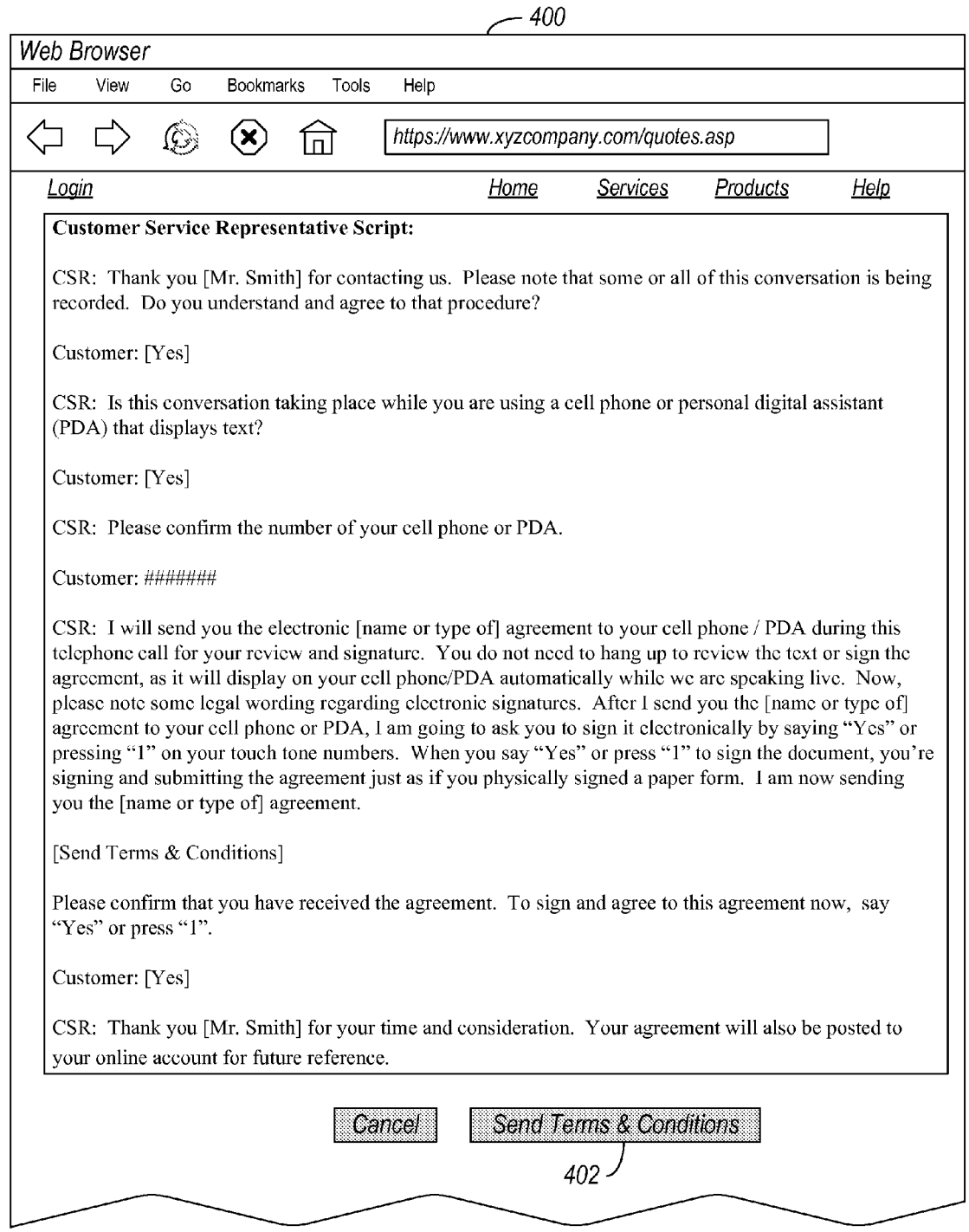
FIG. 4 illustrates an exemplary script for obtaining voice signatures according to the disclosed embodiments.

In some embodiments, a script may be provided to help the customer service representative converse with the customer, discussed with respect to FIG. 4. As can be seen in FIG. 4, a script may be displayed for the customer service representative via a graphical user interface 400 provided by the user interface module 300. The graphical user interface 400 in this implementation is in the form of a company Web page or portal that is accessible using a standard a Web browser, but other types of graphical user interfaces may certainly be used, including customized interfaces developed specifically for a particular business. In any event, the script helps guide the customer service representative ("CSR" in the script) on the words to speak to the customer to obtain his/her voice signature. Additionally, the script helps control the specific point in time during the phone call when the terms and conditions are sent so that they are not sent too early or too late. A "Send Terms & Conditions" button 402 allows the customer service representative to send a message (e.g., text message, e-mail message, etc.) containing the terms and conditions to the customer.

For more advanced mobile devices 114a-b that are capable of more complex file formats, it may be possible to send the terms and conditions in a document or image, such as a PDF, JPEG, or even a Microsoft Word document, instead of a text or e-mail message. An example of the terms and conditions for a typical business transaction is shown below in Example 1.

SAMPLE AUTHORIZATION AGREEMENT

1. Parties. This Authorization Agreement ("Agreement") is between me and [Bank]. The term "Parties" refers to Bank, me and my authorized agent ("Agent").

2. Appointment of Agent. As the account owner of one or more of Bank's products or services ("Account(s)"), I appoint my Agent to act for me through one of the authority levels described below:
  a. "View" Access Authority: Permits my Agent to view my Bank Account information through any access channel, including online, by telephone, in person with a Bank customer service representative or through Bank's interactive voice response systems (collectively referred to as the "Communication Channels").
  b. "Transact" Authority: Permits my Agent to transact business on my Accounts through any Communication Channel, according to my selection of access rights and subject to any limitations noted in this Agreement. My Agent may act for me and in my name, to transact on my Accounts, as fully as I could do.

EXAMPLE 1

At the customer end, the contents of the text or e-mail message may be displayed on the mobile devices 114a-b while the voice call is ongoing. Most modern mobile devices are capable of this dual functionality, which allows the customer to view the terms and conditions at the same time he/she is talking to the customer service representative. This permits the customer to "voice sign," for example, by speaking the word "yes" or pressing the number "1," to evidence his/her knowing consent to the transaction in a manner that complies with the requirements of the E-Sign Act. The terms and conditions may be displayed manually by the customer by pressing the appropriate buttons. Alternatively, some mobile devices 114a-b may be programmed to automatically display the text or e-mail message when it arrives. It is also possible to automatically display the text or e-mail message by sending the text or e-mail message as a high priority message, which causes certain mobile devices 114a-b to automatically display the text or e-mail message upon receipt.

Figure 5:
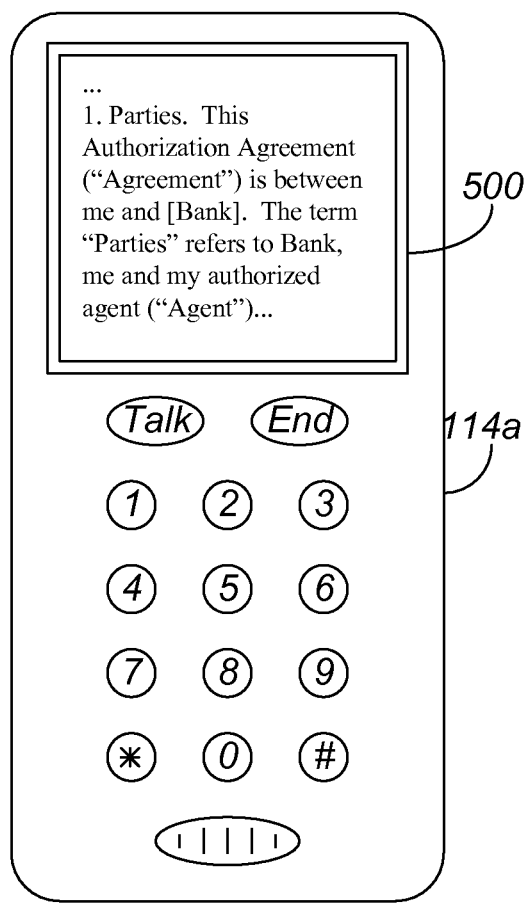
FIG. 5 illustrates an exemplary mobile device for obtaining voice signatures according to the disclosed embodiments.

FIG. 5 illustrates an example of one of the mobile devices 114a-b, for example, the first mobile device 114a, having the terms and conditions displayed thereon. As can be seen, a screen 500 of the mobile device 114 shows the first paragraph of the terms and conditions in Example 1. The customer may then scroll down to see the remainder of the terms and condition. In some embodiments, depending on the length of the terms and conditions (hence, the size of the text or e-mail message), it may be necessary to send multiple text or e-mail messages. In any event, when customer service representative requests the customer to accept the terms and conditions, he/she may do so legally and legitimately.

As mentioned above, in some embodiments, the terms and conditions may be sent in-band with the voice call so that they arrive together with the speech. In such embodiments, the speech may be sent over the data network 108 as voice packets instead of the voice network 106, as would normally be the case with regular voice calls. An example of a protocol that may be used to send voice calls over the data network 108 is the Voice over IP (VoIP) protocol. Other protocols for sending speech over the data network 108 may also be used without departing from the scope of the disclosed embodiments. Sending the speech over the data network 108 allows the text of the terms and conditions to be piggybacked on the voice packets so that the two are sent together across the packet network 110. An example of such a voice packet having the text of the terms and conditions piggybacked thereon is illustrated in FIG. 6.

Figure 6:
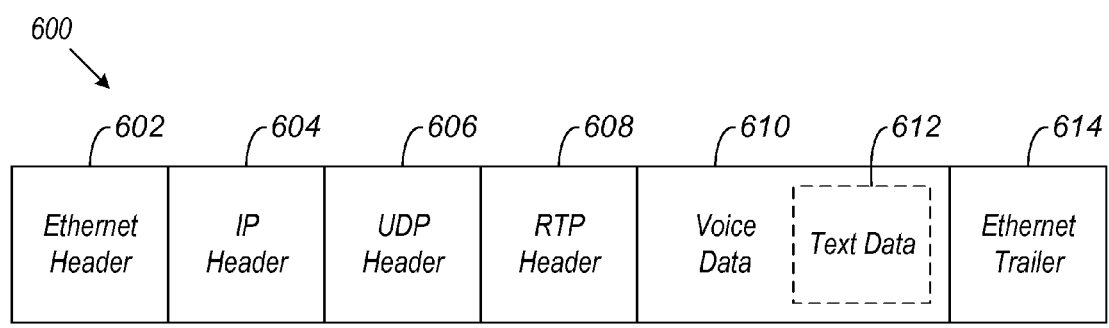
FIG. 6 illustrates an exemplary voice packet for obtaining voice signatures according to the disclosed embodiments.

In FIG. 6 illustrates an example of a VoIP voice packet 600 that may be sent over the voice data network 108. The voice packet in FIG. 6 uses the Real-time Transport Protocol (RTP) packet format for VoIP over Ethernet to carry part of a spoken word. As can be, the voice packet 600 comprises an Ethernet header 602 that carries the LAN addresses of the sending and receiving devices. An IP header 604 carries the sending and receiving IP addresses for the call plus other control information while a UDP header 606 carries the sending and receiving port numbers for the call. An RTP header 608 contains the digitized speech sample (e.g., 20 or 30 ms of a word), time stamp, and sequence number, and identifies the content of each voice packet. The Ethernet trailer 614 is used for error detection purposes.

In accordance with the disclosed embodiments, the voice data field 610 contains text data 612 in addition to digitized voice data. A typical voice data field can contain as many as 320 bytes of uncompressed voice data. By replacing some of these bytes of voice data with bytes of text data, for example, 10%, 20%, 30%, and so on, the terms and conditions may be carried together with the speech. It should be noted that the quality of the voice call may be somewhat degraded if a large percentage of the voice data is replaced with text data. In any event, the voice data and text data may then be extracted and reproduced by the mobile terminals 114a-b upon receipt in a manner known to those having ordinary skill in the art.

Figure 7:
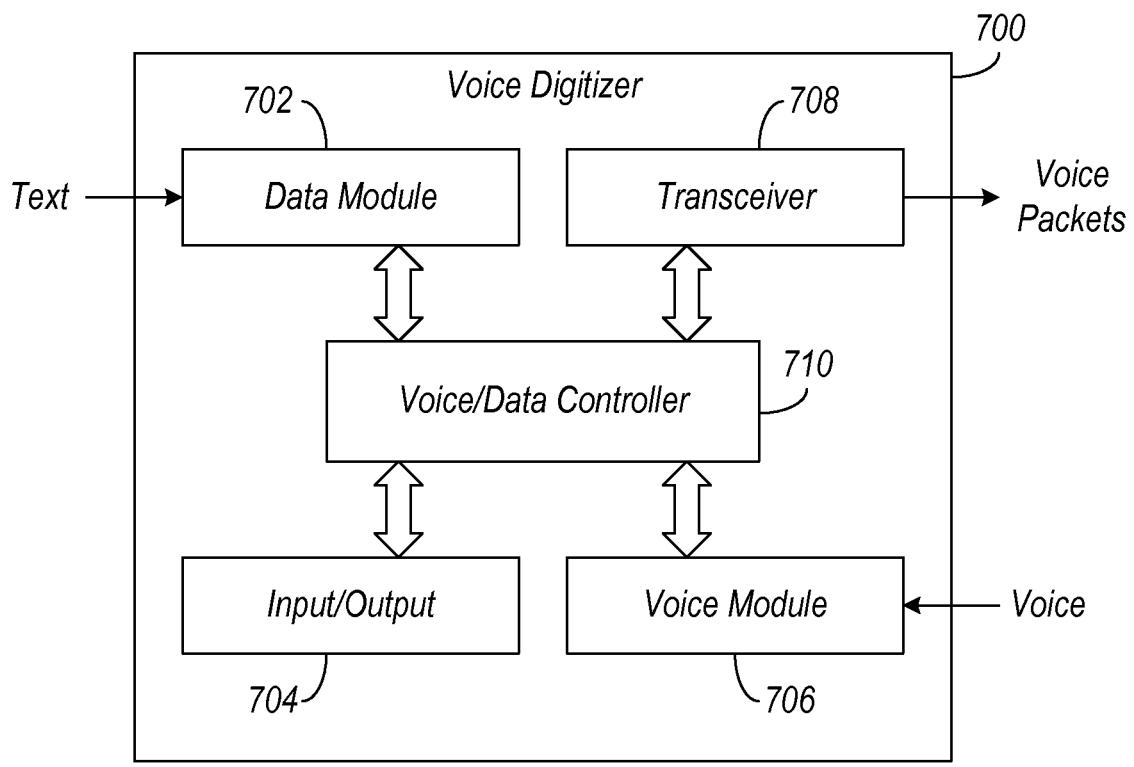
FIG. 7 illustrates an exemplary voice packet application for obtaining voice signatures according to the disclosed embodiments.

FIG. 7 illustrates an exemplary a voice digitizer 700 that may be used to piggyback text data onto a voice packet. Such a voice digitizer 700 may be part of the signature synchronization module in 304 some embodiments (see FIG. 3). As can be seen, the voice digitizer 700 has a number of functional components, including a data module 702, an input/output unit 704, a voice module 706, and a transceiver unit 708. These components of the voice digitizer 700 are generally well known to those having ordinary skill in the art and will therefore be described only briefly here. Furthermore, although multiple discrete components are shown in FIG. 7, any two or more of these components may be combined into a single component, and any single component may be divided into several constituent components, as needed. Similarly, one or more components may be added to or removed from the voice digitizer 700 as needed without departing from the scope of the invention.

In general, the text module 702 is responsible for converting any text messages received by the voice digitizer 700 into text data. The input/output unit 704 is responsible for receiving and translating user commands and the like received by the voice digitizer 700 into electrical signals that can be stored or otherwise used by the voice digitizer 700. The voice module 706 is responsible for digitizing and converting any speech received by the voice digitizer 700 into voice data. The transceiver unit 708 is responsible for sending and receiving voice packets to/from the voice digitizer 700 from/to the data network 108 (see FIG. 1).

In accordance with the disclosed embodiments, the voice digitizer 700 further comprises a voice/text controller 710 configured to combine text data from the text module 702 with voice data from the voice module 706. In some embodiments, the voice/text controller 710 performs this function by generating voice packets, similar to the voice packet 600 of FIG. 6, from the voice data, then appending a predefined number of bytes of text data to each voice packet. The voice/text controller 710 also inserts appropriate content information into the RTP header of the voice packet to allow the mobile device is 114a-b to subsequently reconstruct the speech and text message. Such an arrangement allows speech from a voice call to be synchronized with text from a text message in order to properly capture customer voice signatures.

Figure 8:
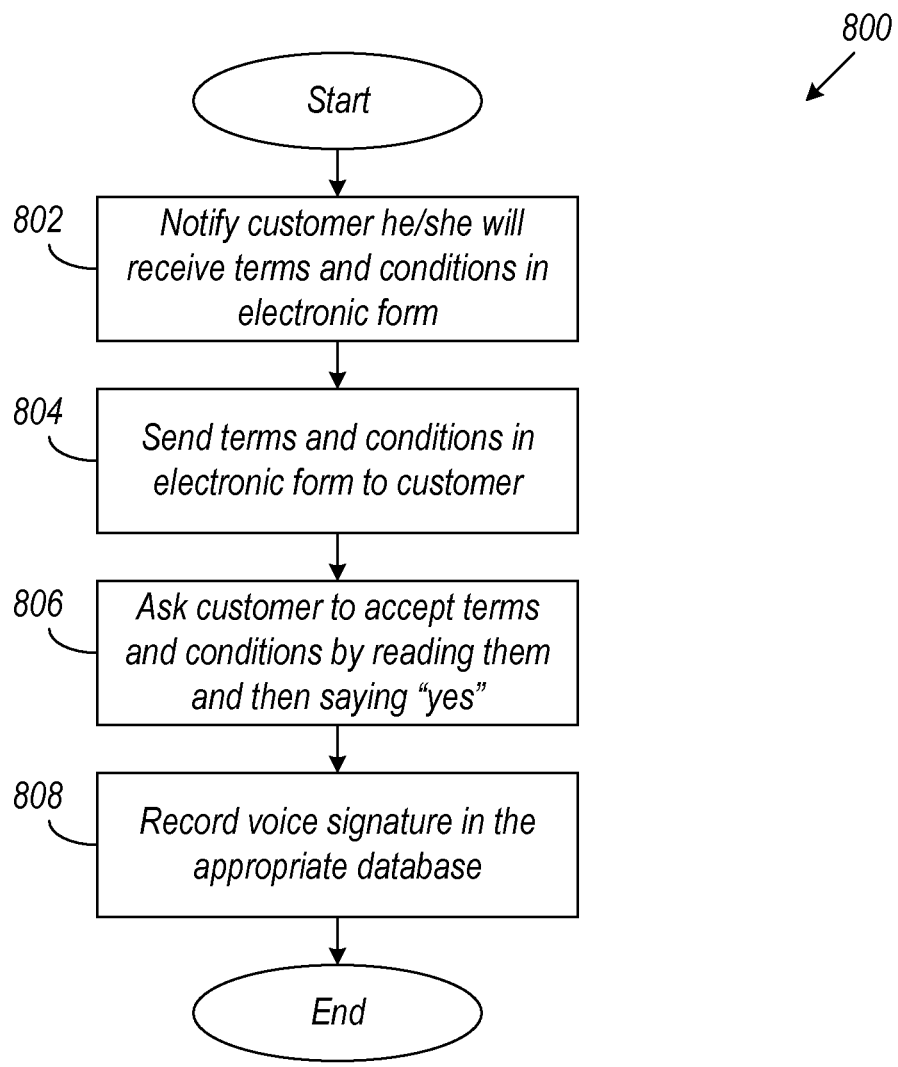
FIG. 8 illustrates an exemplary method of singing voice signatures according to the disclosed embodiments.

Thus far, specific embodiments have been disclosed for obtaining customer voice signatures according to the disclosed embodiments. Referring now to FIG. 8, general guidelines are shown in the form of a method that may be used to implement the various embodiments disclosed above. As can be seen in FIG. 8, a method 800 for obtaining customer voice signatures begins at block 802 where, during a voice call with the customer and after the customer has expressed a desire to proceed with a transaction, a customer service representative may notify the customer that he/she is about to receive the terms and conditions for the transaction in electronic form. At block 804, the customer service representative may send the terms and conditions to the customer in real time during the call. The terms and conditions may be sent as text or e-mail messages in some embodiments, and they may be sent in-band or out-of-band with respect to the voice call in some embodiments.

The customer is thereafter asked to accept the terms and conditions by, for example, speaking the word "yes" or pressing "1" on his/her mobile device. In some embodiments, for more advanced mobile devices, the customer may manifest acceptance of the terms and conditions pointing and clicking on a submit button or the like on the display screen of the mobile device. Once the customer has voice signed by speaking the word "yes" or pressing "1" or has otherwise manifested his/her consent to the terms and conditions of the transaction, an appropriate field in a customer service database may be populated to indicate that a voice signature has been received for the transaction.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for conducting a business transaction with a customer, the system comprising:
    a processor and memory;
    at least one subsystem deployed in the memory and executed by the processor configured to provide information about the business transaction to the customer during a phone call with the customer;
    at least one subsystem deployed in the memory and executed by the processor configured to send terms and conditions for the business transaction to a mobile device of the customer independent of but while the phone call is ongoing with the customer, the mobile device configured to display the terms and condition to the customers while the phone call is ongoing with the customer; and
    at least one subsystem deployed in the memory and executed by the processor configured to ask the customer to manifest acceptance of the terms and conditions for the business transaction as they appear on the mobile device while the phone call is ongoing with the customer.

2. The system of claim 1, wherein the customer may manifest acceptance of the terms and conditions for the transaction by pressing a predefined key on the mobile device while the phone call is ongoing.

3. The system of claim 1, wherein the customer may manifest acceptance of the terms and conditions for the transaction by reading aloud at least a portion of the terms and conditions while the phone call is ongoing.

4. The system of claim 1, wherein the customer may manifest acceptance of the terms and conditions for the transaction by speaking at least one predefined word while the phone call is ongoing.

5. The system of claim 1, wherein the phone call is ongoing with one of: a live customer service representative, and automated interactive voice response system.

6. The system of claim 1, further comprising at least one subsystem deployed in the memory and executed by the processor configured to inform the customer that the acceptance is invalid if manifested while the customer is engaged in a predefined activity.

7. The system of claim 1, further comprising at least one subsystem deployed in the memory and executed by the processor configured to populate a predefined field in a database in response to the customer manifesting acceptance of the terms and conditions for the transaction.

8. A method of conducting a business transaction with a customer that includes utilizing computer-readable medium having stored thereon computer executable instructions executable by a processor to perform the method, the method comprising:
    providing information about the business transaction to the customer during a phone call with the customer;
    sending terms and conditions for the business transaction to a mobile device of the customer independent of but while the phone call is ongoing with the customer, the mobile device configured to display the terms and condition to the customers while the phone call is ongoing with the customer; and
    asking the customer to manifest acceptance of the terms and conditions for the business transaction as they appear on the mobile device while the phone call is ongoing with the customer.

9. The method of claim 8, wherein the customer may manifest acceptance of the terms and conditions for the transaction by pressing a predefined key on the mobile device while the phone call is ongoing.

10. The method of claim 8, wherein the customer may manifest acceptance of the terms and conditions for the transaction by reading aloud at least a portion of the terms and conditions while the phone call is ongoing.

11. The method of claim 8, wherein the customer may manifest acceptance of the terms and conditions for the transaction by speaking at least one predefined word while the phone call is ongoing.

12. The method of claim 8, wherein the phone call is ongoing with one of: a live customer service representative, and automated interactive voice response system.

13. The method of claim 8, further comprising informing the customer that the acceptance is invalid if manifested while the customer is engaged in a predefined activity.

14. The method of claim 8, further comprising populating a predefined field in a database in response to the customer manifesting acceptance of the terms and conditions for the transaction.

15. A non-transitory computer-readable medium encoded with computer-readable instructions for conducting a business transaction with a customer, the computer-readable instructions comprising instructions for causing a computer to:
    provide information about the business transaction to the customer during a phone call with the customer;
    send terms and conditions for the business transaction to a mobile device of the customer independent of but while the phone call is ongoing with the customer, the mobile device configured to display the terms and condition to the customers while the phone call is ongoing with the customer; and
    ask the customer to manifest acceptance of the terms and conditions for the business transaction as they appear on the mobile device while the phone call is ongoing with the customer.

16. The non-transitory computer-readable medium of claim 15, wherein the customer may manifest acceptance of the terms and conditions for the transaction by pressing a predefined key on the mobile device while the phone call is ongoing.

17. The non-transitory computer-readable medium of claim 15, wherein the customer may manifest acceptance of the terms and conditions for the transaction by reading aloud at least a portion of the terms and conditions while the phone call is ongoing.

18. The non-transitory computer-readable medium of claim 15, wherein the customer may manifest acceptance of the terms and conditions for the transaction by speaking at least one predefined word while the phone call is ongoing.

19. The non-transitory computer-readable medium of claim 15, wherein the phone call is ongoing with one of: a live customer service representative, and automated interactive voice response computer-readable medium.

20. The non-transitory computer-readable medium of claim 15, further comprising instructions for causing a computer to inform the customer that the acceptance is invalid if manifested while the customer is engaged in a predefined activity.

21. The non-transitory computer-readable medium of claim 15, further comprising instructions for causing a computer to populate a predefined field in a database in response to the customer manifesting acceptance of the terms and conditions for the transaction.

* * * * *